United States Patent
Moran

(10) Patent No.: US 7,336,904 B2
(45) Date of Patent: Feb. 26, 2008

(54) ELECTRO-MAGNETIC INTERFERENCE REDUCTION FILTER FOR AN OPTICAL TRANSCEIVER

(75) Inventor: Timothy G. Moran, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 19 days.

(21) Appl. No.: 11/289,726

(22) Filed: Nov. 29, 2005

(65) Prior Publication Data

US 2006/0115279 A1 Jun. 1, 2006

Related U.S. Application Data

(60) Provisional application No. 60/631,311, filed on Nov. 29, 2004.

(51) Int. Cl.
*H04B 10/00* (2006.01)
*H04B 10/04* (2006.01)

(52) U.S. Cl. ............... 398/136; 398/159; 398/164; 398/194

(58) Field of Classification Search ............... 398/39, 398/133, 136, 158, 159, 164, 194
See application file for complete search history.

(56) References Cited

U.S. PATENT DOCUMENTS

| 6,470,059 | B2* | 10/2002 | Starr ....................... 375/350 |
| 6,479,979 | B1* | 11/2002 | Kingsley et al. ........... 324/96 |
| 6,781,481 | B2* | 8/2004 | Richardson ............... 333/181 |
| 6,813,168 | B2* | 11/2004 | Balakrishnan ............. 363/44 |
| 6,898,092 | B2* | 5/2005 | Briere et al. ............... 363/39 |
| 2004/0239373 | A1* | 12/2004 | Seshita ....................... 327/65 |
| 2005/0276292 | A1* | 12/2005 | Schrodinger ............ 372/38.02 |

* cited by examiner

*Primary Examiner*—Dalzid Singh
(74) *Attorney, Agent, or Firm*—Workman Nydegger

(57) ABSTRACT

An optical transmit circuit that includes an electro-optic transducer driver and an electro-magnetic interference ("EMI") reduction filter. The EMI reduction filter is coupled to an output terminal of the electro-optic transducer driver. This allows the EMI reduction filter to receive an electrical signal from the transducer driver. The EMI reduction filter then filters out a significant portion of the EMI of concern from the electrical signal.

20 Claims, 4 Drawing Sheets

ELECTRO-MAGNETIC INTERFERENCE REDUCTION FILTER FOR AN OPTICAL TRANSCEIVER

CROSS-REFERENCE TO RELATED APPLICATIONS

This application claims the benefit of U.S. Provisional Application No. 60/631,311, filed Nov. 29, 2004, which is incorporated herein by reference in its entirety.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver.

The operation of an optical transceiver is, however, susceptible to its operating environment. One obvious example of an operating environmental influence is Electro-Magnetic Interference ("EMI"). EMI naturally occurs when the operation of one component causes the unwanted propagation of an electromagnetic field. That electromagnetic field may interfere with the functioning of other proximate electronic components, hence the term "electro-magnetic interference". Since the components inside an optical transceiver are always in close proximity to each other, EMI is a major problem in optical transceivers.

Many of the components in an optical transceiver have a high sensitivity to extraneous analog signals. If these components encounter any EMI, it can lead to distortion and error in the electric or optical signal that the component produces. For example, if the optical transmitter encounters EMI produced by the electro-optic transducer driver, then the optical transmitter may incorporate the EMI signal and transmit an incorrect transmit signal. In addition, the optical transmitter may be damaged by the EMI signals.

EMI can also cause cross talk or unwanted communication between the transmit and receive paths of the optical transceiver. This can result in an incorrect signal being received by the post-amplifier. There may also be cross talk between individual components. In addition, in some cases, EMI can leak back into a component and distort the signal that is being sent. For example, if EMI produced by the electro-optical transducer driver leaked back into the driver, the driver would send an incorrect signal to the optical transmitter.

In many cases, EMI can also cause damage to surrounding circuitry. The EMI signals can often act as radio waves that are transmitted to a wide surrounding area. This can damage other electric circuits that receive the radio waves. This phenomenon is especially problematic in optical transceivers as multiple transceivers are often used together within a single host. EMI from any one of the optical transceivers can damage the other optical transceivers or distort the transmit signals of the other optical transceivers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The forgoing problems with the prior state of the art are overcome by the embodiments disclosed herein. The embodiments disclosed herein may be implemented in an optical transmit circuit such as, for example, an optical transceiver and/or a host computing system. The optical transmit circuit includes an electro-optic transducer driver and an electro-magnetic interference ("EMI") reduction filter, as well as potentially the electro-optic transducer itself.

The EMI reduction filter is coupled to an output terminal of the electro-optic transducer driver. This allows the EMI reduction filter to receive an electrical signal from the transducer driver. The EMI reduction filter then filters out a significant portion of the EMI of concern from the electrical signal.

The filtering accomplished by the EMI reduction filter allows for greatly improved operation of the optical transceiver. The filter prevents the EMI from acting like radio waves. This prevents EMI from one optical transmit circuit causing damage to surrounding optical transceivers or other electronic circuitry or from distorting the transmit signals in other optical transceivers.

In addition, the filter prevents EMI from causing problems in the actual optical transmit circuit itself. For example, the filter prevents cross talk between the transmit and receive paths. There is also a significant reduction in any leak back of electric signals into the transducer driver. The filtering ensures that the signal transmitted by the transducer driver to the electro-optical transducer is correct.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the embodiments disclosed herein, a more particular description of the embodiments will be rendered by reference to specific embodiments thereof which are illustrated in the appended drawings. It is, appreciated that these drawings depict only typical embodiments and are therefore not to be considered limiting of the appended claims. The embodiments disclosed herein will be described and explained with additional specificity and detail through the use of the accompanying drawings in which:

DETAILED DESCRIPTION OF THE PREFERRED EMBODIMENTS

The embodiments disclosed herein relate to an optical transmit circuit that includes an electro-optic transducer driver and an electro-magnetic interference ("EMI") reduction filter, as well as potentially the electro-optic transducer itself. The EMI reduction filter is coupled to an output terminal of the electro-optic transducer driver. The EMI reduction filter filters out a significant portion of the EMI of concern from the electrical signal provided by the electro-optic transducer driver.

Figure 1:
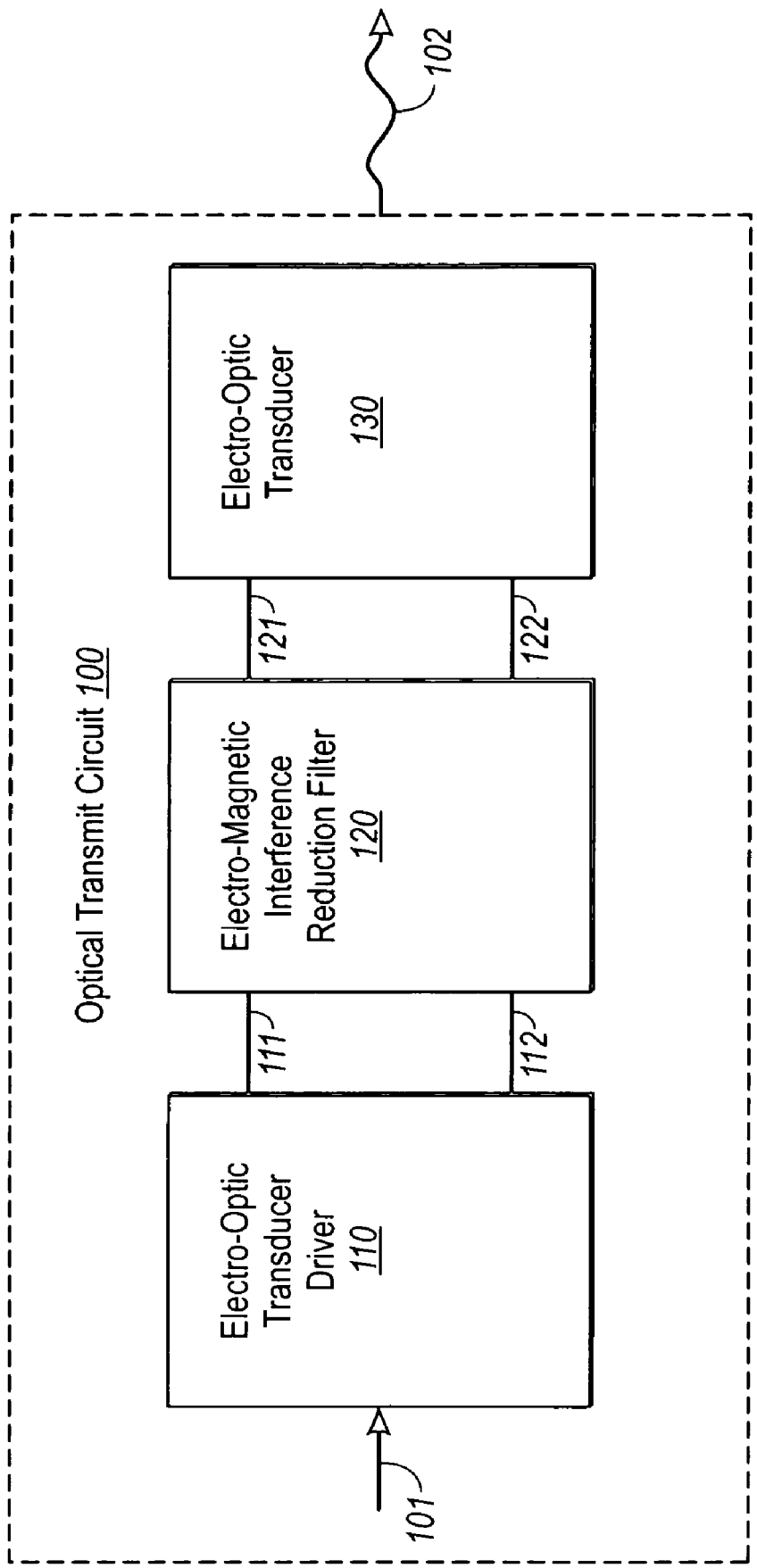
FIG. 1 illustrates a schematic diagram of an optical transmit circuit that includes an Electro-Magnetic Interference (EMI) reduction filter in accordance with embodiments disclosed herein.

FIG. 1 illustrates an optical transmit circuit 100 in which the embodiments disclosed herein may be employed. While the optical transmit circuit 100 will be described in some detail, the optical transmit circuit 100 is described by way of illustration only, and not by way of restricting the scope of the appended claims. The embodiments disclosed herein are suitable for 1 G, 2 G, 4 G, 10 G and higher bandwidth fiber optic links. Furthermore, the embodiments disclosed herein may be implemented in optical (e.g., laser) transmitter/receivers of any form factor such as XFP, SFP and SFF, without restriction. Having said this, the embodiments disclosed herein are not limited to an optical transceiver environment at all.

The optical transmit circuit 100 may receive an electrical signal from a source such as a host computing system connected to electro-optic transducer driver 110 as represented by arrow 101. Electro-optic transducer driver 110, which may be, but is not limited to, a laser driver or a Light Emitting Diode (LED) driver, is used to drive electro-optic transducer 130 by controlling operational parameters such as bias current. An EMI reduction filter 120 is interposed between the electro-optic transducer driver 110 and the electro-optic transducer 130 so as to reduce EMI emissions.

Electro-optic transducer driver 110 has two output terminals, both of which are coupled to the input terminals of the EMI reduction filter 120, as shown by connections 111 and 112. Although two connections are illustrated between the electro-optic transducer driver 110 and the EMI reduction filter 120 for differential signaling, the electro-optic transducer driver 110 may also have one connection in the case of a single-ended output driver. Alternatively, the electro-optic transducer driver 110 may have more than two signal connections with the EMI reduction filter 120.

The EMI reduction filter 120 receives an electric signal from electro-optic transducer driver 110 over connections 111 and 112. Although shown with two input terminals, the EMI reduction filter 120 may have one input terminal or any number of additional input terminals as necessary. In many embodiments, the EMI reduction filter 120 will have the same number of input terminals as electro-optic transducer driver 110 has output terminals, although this is not required. The EMI reduction filter 120 filters the electric signal received from electro-optic transducer driver 110 by removing unwanted signal components such as, for example, differential mode and particularly common mode frequency components, at particularly sensitive EMI frequencies. This greatly reduces the amount of EMI that is produced by transmit circuit 100 and reduces the resulting harm from EMI. EMI reduction filter 120 may be any reasonable electrical filter, specific embodiments of which will be described below.

Electro-optical transducer 130 input terminals are connected to the output terminals of EMI reduction filter 120 as shown by connections 121 and 122. Electro-optical transducer 130 may have two input terminals as shown in FIG. 1 or it may have a single terminal or additional input terminals as needed. Electro-optical transducer 130, which may be a laser or an LED, receives the filtered electric signal from EMI reduction filter 120 and transforms the filtered electric signal into an optical signal that is representative of the information contained in the electric signal. Electro-optical transducer 130 may then emit the optical signal onto an output connection 102. Optical connection 102 may be, for example, an optical fiber coupled to a remote optical transceiver. In this way, optical transmit circuit 100 works to take an electric signal, transform it into an optical signal, and communicate with an outside source.

The optical transmit circuit 100 may be part of an optical transceiver module and/or it may be part of a host computing system. Alternatively, portions of transmit circuit 100 may be within the optical transceiver, while other portions are in the host computing system. For example, the transmit circuit 100 may be entirely enclosed by an optical transceiver module. The optical transceiver may be coupled to a host computing system. Alternatively, a component of transmit circuit 100, for example the electro-optic transducer driver 110, may be housed in the host computing system while the remaining components are housed within an optical transceiver module. The placement of transmit circuit 100 components, whether in a host computing system or an optical transceiver module is not important to the embodiments disclosed herein.

Figure 2:
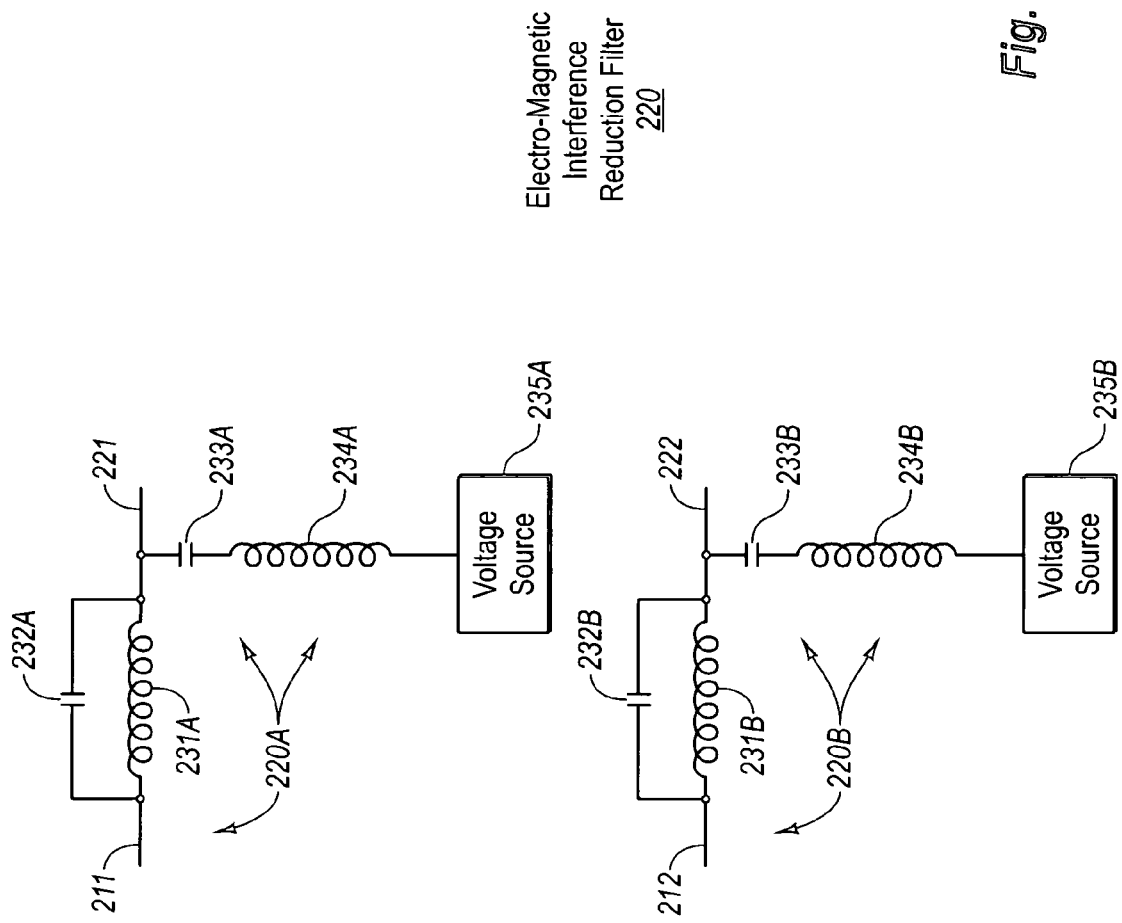
FIG. 2 illustrates a circuit diagram of a first embodiment of the EMI reduction filter of FIG. 1.

FIG. 2 schematically illustrates an example EMI reduction filter 220 corresponding to one particular embodiment of the EMI reduction filter 120. EMI reduction filter 220 may contain one or more filter portions, as illustrated by EMI filter portions 220A and 220B, depending on the number of electro-optic transducer driver output terminals. For example, if the output from the electro-optic transducer driver is single-ended, then perhaps only one of the EMI filter portions 220A or 220B will be present. Alternatively, if there are more than two outputs from the electro-optic transducer driver, there may be more than two such EMI filter portions, one for each signal that is to be subjected to EMI filtration.

As previously mentioned, in one embodiment of the present invention, electro-optic transducer driver 110 may have a single output terminal that is coupled to EMI reduction filter 120 by connection 111. EMI reduction filter 220 may be implemented as EMI filter 220A, which may be coupled to the single output terminal of the electro-optic transducer driver. EMI reduction filter 220A receives an electrical signal from the electro-optic transducer driver over connection 211 and sends the filtered electrical signal to the electro-optic transducer over connection 221. If the EMI reduction filter 220 is an embodiment of the EMI reduction filter of FIG. 1, connections 211 and 221 would correspond to connections 111 and 121, respectively, in FIG. 1, and have the functionality previously described.

In a first embodiment, EMI reduction filter portion 220A may be designed to filter out unwanted components from an electrical signal at a first frequency. In order to achieve filtering at the first frequency, an inductive and capacitive (LC) bandstop notch filter may be implemented as illustrated in the filter portion 220A of FIG. 2. Specifically, an inductor 231A has a first terminal (i.e., the left terminal of the illustrated case) coupled to the input terminal 211 and a second terminal (i.e., the right terminal of the illustrated case) coupled to output terminal 221. In addition, a capacitor 232A is connected in parallel with inductor 231A by having a first terminal (i.e., the left terminal of the illustrated case) connected to the first terminal of inductor 231A and a second terminal (i.e., the right terminal of the illustrated case) connected to the second terminal of inductor 231A. The parallel combination of both components will create a LC bandstop notch filter that filters an electrical signal based on the values of inductor 231A and capacitor 232A, as will be appreciated by those of ordinary skill in the art after having reviewed this description.

Proper values for inductor 231A and capacitor 232A may be determined by applying the following design equations:

$$\omega = 2\pi f \quad (1)$$

$$\omega = 1/\sqrt{(LC)} \quad (2)$$

First, the angular frequency ω may be calculated based on the desired frequency to be filtered. The values of inductor 231A and capacitor 232A may be determined by setting the angular frequency equal to one divided by the square root of the product of the inductor times the capacitor and then solving for L and C. In this way, EMI reduction filter 220A may be configured to filter a specific desired frequency.

In a second embodiment, EMI reduction filter portion 220A may also be designed to filter the first frequency as discussed above and a second frequency that is not the same as the first frequency. An additional LC band stop filter may be implemented as also seen in the EMI reduction filter portion 220A of FIG. 2. The additional LC band stop filter may be coupled to the LC band stop notch filter, which may be implemented as previously discussed.

A capacitor 233A is coupled by a first terminal (i.e., the upper terminal of the illustrated case) to the output terminal 221 of EMI reduction filter portion 220A. The second terminal (i.e., the lower terminal of the illustrated case) of capacitor 233A is coupled in series to a first terminal (i.e., the upper terminal of the illustrated case) of inductor 234A. The second terminal (i.e., the lower terminal of the illustrated case) of inductor 234A is in turn coupled to a voltage source 235A. Voltage source 235A may be any low voltage source, a suitable example being ground. The series combination of both components will create a LC band stop filter that filters an electrical signal based on the values of capacitor 233A inductor 234A. Proper values for capacitor 233A and inductor 234A may also be determined using Equations 1 and 2. In this way, EMI reduction filter 220A may be configured to filter a desired second frequency.

Figure 4:
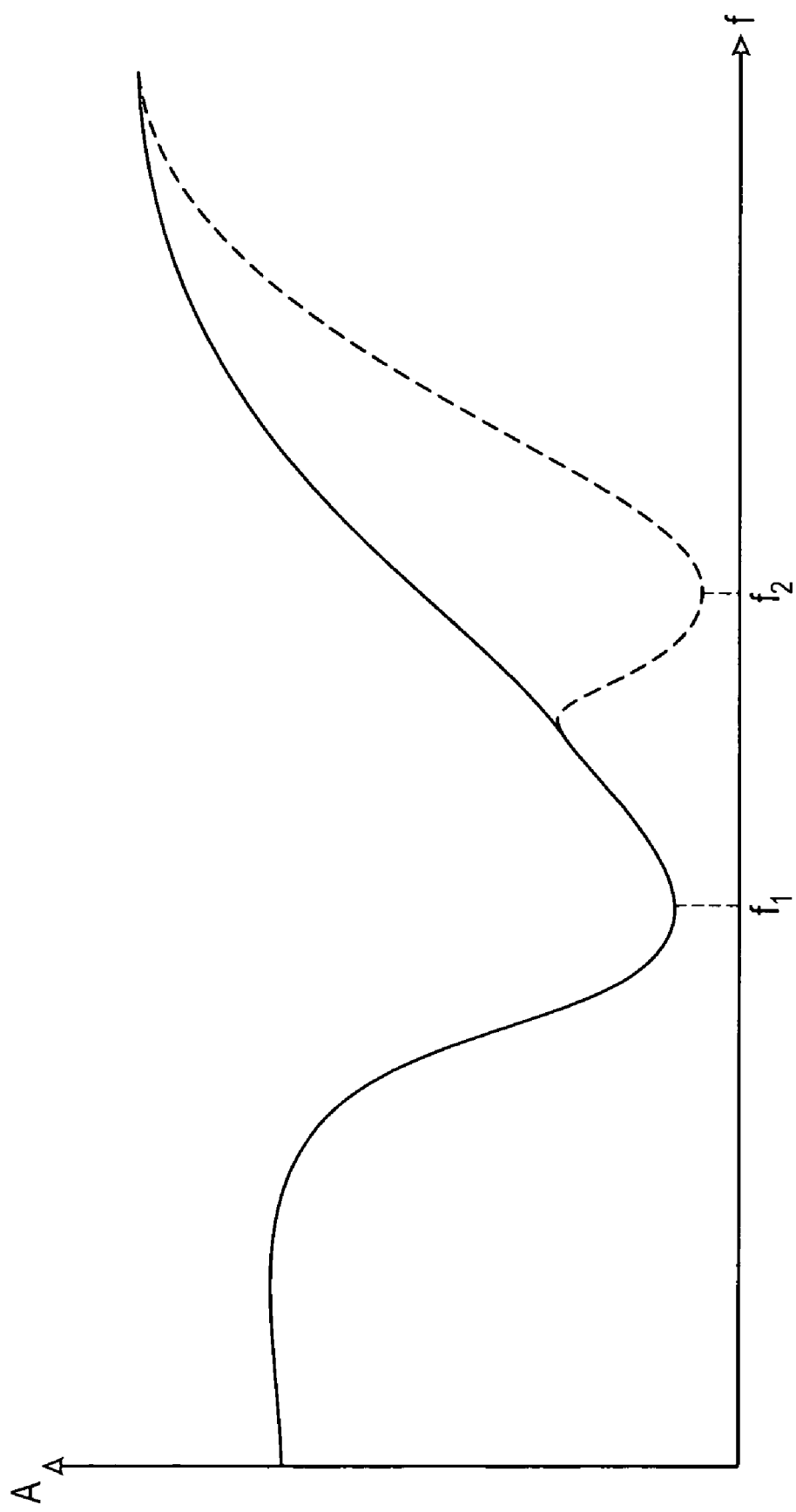
FIG. 4 schematically illustrates a frequency response diagram showing the frequency verses amplitude characteristics of an example EMI reduction filter.

Referring to FIG. 4, a frequency response diagram showing the frequency verses amplitude characteristics of an example band stop EMI reduction filter such as the embodiment represented by EMI reduction filter portion 220A in FIG. 2 is shown. This frequency response diagram shows an electrical signal being filtered at a frequency $f_1$ and at a frequency $f_2$.

The solid curve shows the frequency response of the electrical signal passing only through the LC notch filter portion of EMI reduction filter portion 220A, comprising the parallel combination of inductor 231A and 232A shown in FIG. 2. At low frequencies, capacitor 232A behaves like an open circuit with infinite impedance and inductor 231A behaves like a short circuit. Consequently, the signal is able to flow through inductor 231A. As the frequency increases, inductor 231A has an increase in impedance and capacitor 232A starts to show a decrease in impedance. This begins to increase the impedance of the parallel combination of the inductor 231A and capacitor 232A, thereby decreasing the magnitude of the electric signal. As the frequency approaches $f_1$, the impedance of both the inductor and the capacitor approach each other. In an ideal filter, the impedances will be equal and the amplitude of the electric signal will be zero at $f_1$. As the frequency moves beyond $f_1$, the impedance of inductor 231A increases until at high frequencies the inductor 231A behaves like an open circuit. Conversely, as frequency increases, capacitor 232A begins to behave like a short circuit and allows the signal to flow there through.

The dashed curve shows the frequency response of the electrical signal when it passes through the LC band stop filter comprising the series combination of capacitor 233A and inductor 234A after having already passed through the LC notch filter previously discussed. At low frequencies capacitor 233A acts like an open circuit having infinite impedance, preventing signal flow. As the frequency increases, the impedance of capacitor 233A begins to decrease and the impedance of inductor 234A begins to rise. However, the impedance of the LC band stop filter portion (comprising capacitor 233A and inductor 234A) remains greater than the impedance of the LC notch filter portion (comprising inductor 231A and capacitor 232A). This causes the two filter portions to act as a voltage divider circuit. As the frequency approaches $f_2$, the impedance of the LC band stop filter portion becomes less than the LC notch filter portion and thus the electric signal at that frequency is pulled closer to voltage source 235A. As the frequency increases beyond $f_2$, the impedance of inductor 234A increases until the inductor 234A acts like an open circuit, preventing signal flow to voltage source 235A.

The general frequency response of an electrical signal passing through EMI reduction filter 220A is the same for all frequencies $f_1$ and $f_2$. If the desired filtering frequencies change to a new $f_1$ and $f_2$, then the capacitors and inductors in the EMI reduction filter may be changed to make the filter work at the new frequencies.

For example, in one embodiment, one frequency that is desired to be filtered may be 6 GHz. A second frequency that is desired to be filtered may be 8 GHz. Operation of transmit circuit 100 at either of these frequencies may cause unwanted EMI in the form of unwanted harmonics. The values of inductor 231A and capacitor 232A in the LC notch filter portion may be selected so as to filter out a signal at 6 GHz. As well, capacitor 233A and inductor 234A in the LC band stop filter portion may be selected so as to filter out a signal at 8 GHz. Alternatively, inductor 231A and capacitor 232A in the LC notch filter portion may be chosen so as to filter out a signal at 8 GHz and capacitor 233A and inductor 234A in the LC band stop filter portion may be selected so as to filter out a signal at 6 GHz. EMI reduction filter 220A may be designed to filter other frequencies by selecting different values for inductor 231A and capacitor 232A in the LC notch filter portion and capacitor 233A and inductor 234A in the LC band stop portion.

In some embodiments, electro-optic transducer driver 110 may have two or more output terminals. Referring again to FIG. 2, EMI reduction filter portion 220B is shown. EMI reduction filter portion 220B may be coupled to a second output terminal of the electro-optic transducer driver while EMI reduction filter portion 220A is coupled to a first output terminal of the electro-optic transducer driver as already described. EMI reduction filter portion 220B receives an electrical signal from the electro-optic transducer driver over connection 212 and sends the filtered electrical signal to the electro-optic transducer over connection 222. Connections 212 and 222 may correspond, for example, to connections 112 and 122, respectively, of FIG. 1, and have the functionality previously described.

The EMI reduction filter portions 220A and 220B may be designed to filter out unwanted components from an electrical signal at a first frequency. In order to achieve filtering at the first frequency, a LC band stop notch filter may be implemented in both filter portions as illustrated in FIG. 2.

In filter portion 220A, the LC notch band stop filter may be implemented as previously discussed. In filter portion 220B, an inductor 231B has a first terminal (i.e., the left terminal of the illustrated case) coupled to the input terminal 212 and a second terminal (i.e., the right terminal of the illustrated case) coupled to output terminal 222. In addition, a capacitor 232B is connected in parallel with inductor 231B by having a first terminal (i.e., the left terminal of the illustrated case) connected to the first terminal of inductor 231B and a second terminal (i.e., the right terminal of the illustrated case) connected to the second terminal of inductor 231B. The parallel combination of both components will create a LC band stop notch filter that filters an electrical signal based on the values of inductor 231B and capacitor 232B. Proper values of inductor 231B and capacitor 232B may be selected by use of Equations 1 and 2.

In another embodiment, EMI reduction filter portions 220A and 220B may be designed to filter the first frequency as discussed above and a second frequency that is not the same as the first frequency. An additional LC band stop filter may be implemented as also seen in FIG. 2. The additional LC band stop filter may be coupled to the LC band stop notch filter, which may be implemented as previously discussed. In one embodiment, the additional LC band stop filter is only implemented in EMI reduction filter portion 200A. In other embodiments, the additional LC band stop filter is implemented in both EMI reduction filter portions 220A and 220B.

A capacitor 233A is coupled by a first terminal (i.e., the upper terminal of the illustrated case) to the output terminal 221 of EMI reduction filter portion 220A. The second terminal (i.e., the lower terminal of the illustrated case) of capacitor 233A is coupled in series to the first terminal (i.e., the upper terminal of the illustrated case) of inductor 234A. The second terminal (i.e., the lower terminal of the illustrated case) of inductor 234A is in turn coupled to a voltage source 235A. Voltage source 235A may be a low voltage source or it may be a ground.

A capacitor 233B is also coupled by a first terminal (i.e., the upper terminal of the illustrated case) to the output terminal 222 of EMI reduction filter portion 220B. The second terminal (i.e., the lower terminal of the illustrated case) of capacitor 233B is coupled in series to the first terminal (i.e., the upper terminal of the illustrated case) of inductor 234B. The second terminal (i.e., the lower terminal of the illustrated case) of inductor 234B is in turn coupled to a voltage source 235B. Voltage source 235B may be a low voltage source or it may be a ground. In some embodiments, voltage sources 235A and 235B may be different voltage sources. In other embodiments, voltage sources 235A and 235B may be the same voltage source. Proper values for capacitor 233B and inductor 234B may be determined using Equations 1 and 2.

The frequency response of EMI reduction filter portion 220B at a first frequency $f_1$ and a second frequency $f_2$ is the same as EMI reduction filter portion 220A discussed earlier and may be seen in FIG. 4. As in filter portion 220A, the response at $f_1$ is caused by the LC notch filter created by the parallel combination of inductor 231B and capacitor 232B and the response at $f_2$ is caused by the LC band stop filter created by the series combination of capacitor 233B and inductor 234B. The desired frequencies for filtering may be changed by selecting new values for the inductors and the capacitors in EMI filter portion 220B.

Figure 3:
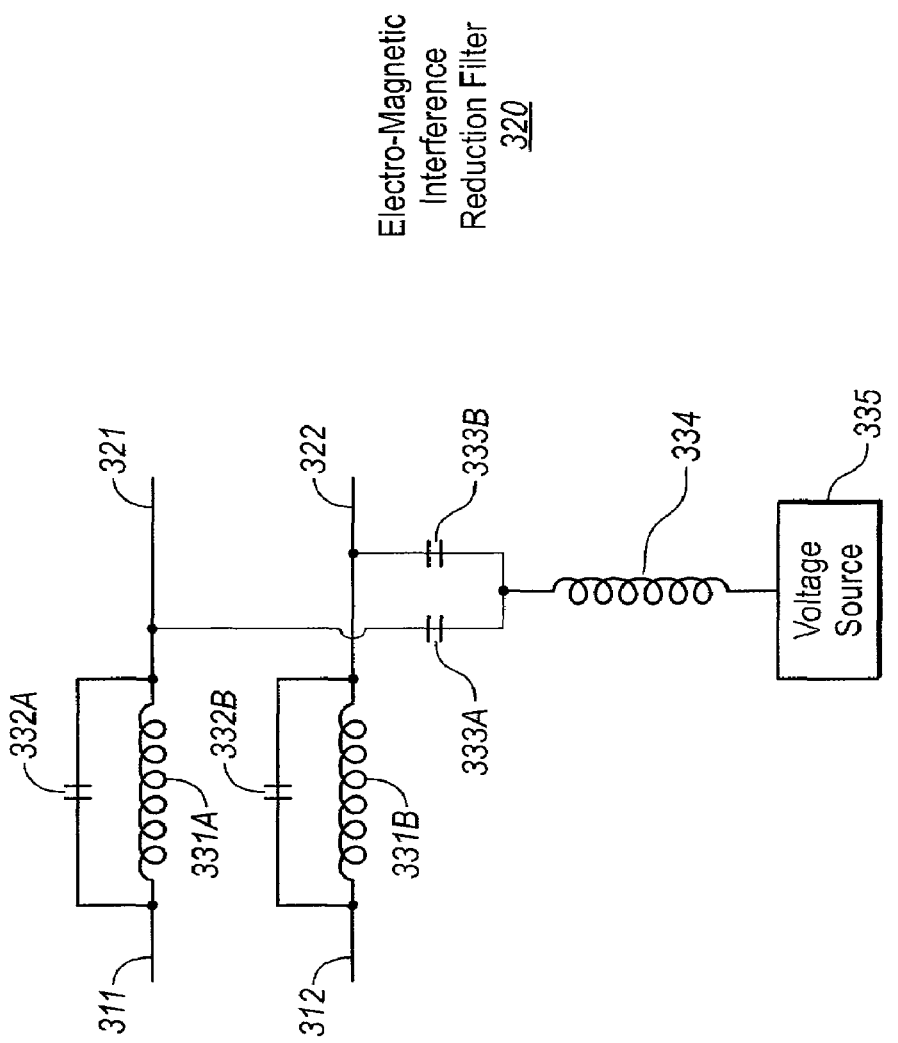
FIG. 3 illustrates a circuit diagram of a second embodiment of the EMI reduction filter of FIG. 1.

FIG. 3 illustrates an additional two terminal embodiment. Connections 311 and 312 may correspond to connections 111 and 112, and connections 321 and 322 may correspond to connections 121 and 122 in FIG. 1, although this is not required.

Referring to FIG. 3, EMI reduction filter 320 has an LC notch filter portion created by the parallel combination of inductor 331A and capacitor 332A and a LC notch filter portion created by the parallel combination of inductor 331B and capacitor 332B. Both of these LC notch filter portions are functionally the same as the LC notch filter portions of EMI reduction filter 220 described with respect to FIG. 2. The values of the capacitors and inductors may be chosen by use of Equations 1 and 2 and may be varied to meet a desired filtering frequency.

EMI reduction filter 320 may also have additional LC band stop filter portions for filtering at more than one frequency. A capacitor 333A has a first terminal (i.e., the upper terminal of the illustrated case) coupled to filter output terminal 321. Another capacitor 333B also has a first terminal (i.e., the upper terminal of the illustrated case) coupled to filter output terminal 322. Both capacitors 333A and 333B have a second terminal (e.g., the lower terminal of the illustrated case) coupled in series to a first terminal (e.g., the upper terminal of the illustrated case) of an inductor 334. The second terminal (e.g., the lower terminal of the illustrated case) of inductor 334 is coupled in series to a voltage source 335, which in some embodiments may be a ground.

Although both capacitors 333A and 333B share inductor 334, the LC band stop filter portions are functionally the same as the LC band stop portions described with respect to EMI reduction filter 220 in FIG. 2. The capacitors act as open circuits at low frequencies and the inductor acts as an open circuit a high frequencies. Implementing one inductor instead of two separate inductors in the LC band stop portions saves valuable space as only one component is used. Specifically, the inductance of inductor 334 in FIG. 3 need only have half the inductance of each of the inductors 234A and 234B in EMI reduction filter 220 in FIG. 2.

Accordingly, the embodiments described herein relate to an optical transmit circuit such as an optical transceiver and/or a host computing system. The optical transmit circuit includes an EMI reduction filter capable of removing unwanted EMI at various frequencies. By placing the EMI reduction filter between the electro-optic transducer driver and the electro-optic transducer, the unwanted EMI is prevented from causing damage to other electrical components or causing distortion in the transmit signals. The EMI reduction filter also helps ensure that a correct signal is transmitted by the optical transmit circuit to an outside source. Accordingly, the embodiments described herein are a significant advancement in the art of optical transmit circuits including optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmit circuit comprising:
    an electro-optic transducer driver having at least one output terminal, the at least one output terminal comprising a first electro-optic transducer driver output terminal; and
    an electro-magnetic interference reduction filter coupled to the at least one output terminal of the electro-optical transducer driver so as to receive and filter a signal received from the electro-optical transducer driver, the electro-magnetic interference reduction filter comprising:
        a first inductor having a first terminal coupled to the first electro-optic transducer driver output terminal; and
        a first capacitor having a first terminal coupled to the first terminal of the first inductor, and having a second terminal coupled to a second terminal of the first inductor and to a first output terminal of the electro-magnetic interference reduction filter.

2. An optical transmit circuit in accordance with claim 1, further comprising:
    an electro-optical transducer coupled to the electro-magnetic interference reduction filter so as to convert electrical signals received from the electro-optical transducer into corresponding optical signals.

3. An optical transmit circuit in accordance with claim 2, wherein the electro-optical transducer comprises a laser.

4. An optical transmit circuit in accordance with claim 2, wherein the electro-optical transducer comprises a Light Emitting Diode (LED).

5. An optical transmit circuit in accordance with claim 1, wherein the electro-magnetic interference reduction filter further comprises the following:
    a second capacitor; and
    a second inductor coupled in series with the second capacitor between the first output terminal of the electro-magnetic interference reduction filter and a voltage source.

6. An optical transmit circuit in accordance with claim 5, wherein the first capacitor and first inductor are sized to maximize filtration at a first frequency, and the second capacitor and second inductor are sized to maximize filtration at a second frequency that is different than the first frequency.

7. An optical transmit circuit in accordance with claim 6, wherein the first frequency is approximately six gigahertz, and the second frequency is approximately eight gigahertz.

8. An optical transmit circuit in accordance with claim 6, wherein the first frequency is approximately eight gigahertz, and the second frequency is approximately six gigahertz.

9. An optical transmit circuit in accordance with claim 1, wherein the at least one output terminal of the electro-optic transducer driver further comprises a second electro-optic transducer driver output terminal, the electro-magnetic interference reduction filter further comprising the following:
    a second inductor having a first terminal coupled to the second electro-optic transducer driver output terminal; and
    a second capacitor having a first terminal coupled to the first terminal of the second inductor, and having a second terminal coupled to a second terminal of the second inductor and to a second output terminal of the electro-magnetic interference reduction filter.

10. An optical transmit circuit in accordance with claim 9, further comprising:
    a third capacitor having a first terminal coupled to the second terminal of the first inductor and to the first output terminal of the electro-magnetic interference reduction filter;
    a fourth capacitor having a first terminal coupled to the second terminal of the second inductor and to the second output terminal of the electro-magnetic interference reduction filter; and
    a third inductor having a first terminal coupled to a second terminal of the third capacitor and a second terminal of the fourth capacitor, and having a second terminal coupled to a voltage source.

11. An optical transmit circuit in accordance with claim 9, wherein the electro-magnetic interference reduction filter further comprises the following:
    a third capacitor; and
    a third inductor coupled in series with the third capacitor between the first output terminal of the electro-magnetic interference reduction filter and a first voltage source.

12. An optical transmit circuit in accordance with claim 11, wherein the electro-magnetic interference reduction filter further comprises the following:
    a fourth capacitor; and
    a fourth inductor coupled in series with the fourth capacitor between the second output terminal of the electro-magnetic interference reduction filter and a second voltage source.

13. An optical transmit circuit in accordance with claim 12, wherein the first and second voltage sources are the same.

14. An optical transmit circuit in accordance with claim 12, wherein the first and second voltage sources are different.

15. An optical transmit circuit in accordance with claim 1, wherein the electro-optical transducer driver is situated within an optical transceiver module.

16. An optical transmit circuit in accordance with claim 1, wherein the electro-optical transducer driver is situated within an optical transceiver host.

17. An optical transmit circuit in accordance with claim 1, wherein the optical transmit circuit is an optical transceiver.

18. An optical transmit circuit comprising:
    an electro-optical transducer driver having a first output terminal and a second output terminal;

an electro-magnetic interference reduction filter comprising the following:
   a first inductor having a first terminal coupled to the first electro-optic transducer driver output terminal;
   a first capacitor having a first terminal coupled to the first terminal of the first inductor, and having a second terminal coupled to a second terminal of the first inductor and to a first output terminal of the electro-magnetic interference reduction filter;
   a second capacitor;
   a second inductor coupled in series with the second capacitor between the first output terminal of the electro-magnetic interference reduction filter and a voltage source;
   a third inductor having a first terminal coupled to the second electro-optic transducer driver output terminal;
   a third capacitor having a first terminal coupled to the first terminal of the third inductor, and having a second terminal coupled to a second terminal of the third inductor and to a second output terminal of the electro-magnetic interference reduction filter;
   a fourth capacitor; and
   a fourth inductor coupled in series with the fourth capacitor between the second output terminal of the electro-magnetic interference reduction filter and a second voltage source; and
an electro-optical transducer coupled to the electro-magnetic interference reduction filter so as to convert electrical signals received from the electro-optical transducer into corresponding optical signals.

19. An optical transmit circuit in accordance with claim 18, wherein the optical transmit circuit is an optical transceiver.

20. An optical transmit circuit comprising:
an electro-optical transducer driver having a first output terminal and a second output terminal;
an electro-magnetic interference reduction filter comprising the following:
   a first inductor having a first terminal coupled to the first electro-optic transducer driver output terminal;
   a first capacitor having a first terminal coupled to the first terminal of the first inductor, and having a second terminal coupled to a second terminal of the first inductor and to a first output terminal of the electro-magnetic interference reduction filter;
   a second inductor having a first terminal coupled to the second electro-optic transducer driver output terminal;
   a second capacitor having a first terminal coupled to the first terminal of the second inductor, and having a second terminal coupled to a second terminal of the second inductor and to a second output terminal of the electro-magnetic interference reduction filter a third capacitor having a first terminal coupled to the second terminal of the first inductor and to the first output terminal of the electro-magnetic interference reduction filter;
   a fourth capacitor having a first terminal coupled to the second terminal of the second inductor and to the second output terminal of the electro-magnetic interference reduction filter; and
   a third inductor having a first terminal coupled to a second terminal of the third capacitor and a second terminal of the fourth capacitor, and having a second terminal coupled to a voltage source.

* * * * *

UNITED STATES PATENT AND TRADEMARK OFFICE
CERTIFICATE OF CORRECTION

PATENT NO. : 7,336,904 B2  Page 1 of 1
APPLICATION NO. : 11/289726
DATED : February 26, 2008
INVENTOR(S) : Moran It is certified that error appears in the above-identified patent and that said Letters Patent is hereby corrected as shown below:

Column 7
Line 57, change "200A" to --220A--

Column 12
Line 20, insert a --;-- followed by a line break after "filter"

Signed and Sealed this

Sixth Day of July, 2010

David J. Kappos
*Director of the United States Patent and Trademark Office*